United States Patent
Lu et al.

(10) Patent No.: US 8,103,812 B2
(45) Date of Patent: Jan. 24, 2012

(54) ELECTRONIC SYSTEM

(76) Inventors: Wei-Hua Lu, Taipei (TW); Chih-Kuei Hu, Jubei (TW); Wei-Ting Liu, Hacienda Heights, CA (US)

( * ) Notice: Subject to any disclaimer, the term of this patent is extended or adjusted under 35 U.S.C. 154(b) by 149 days.

(21) Appl. No.: 12/634,698

(22) Filed: Dec. 10, 2009

(65) Prior Publication Data

US 2011/0145446 A1  Jun. 16, 2011

(51) Int. Cl.
*G06F 15/16* (2006.01)

(52) U.S. Cl. .......................................... 710/72; 709/205

(58) Field of Classification Search .................. None
See application file for complete search history.

(56) References Cited

U.S. PATENT DOCUMENTS

2008/0168291 A1* 7/2008 Freedman ..................... 713/375

OTHER PUBLICATIONS

Chu, Mobile OGSI.NET: Grid Computing on Mobile Devices, 2004, IEEE International Workshop on Grid Computing, pp. 1-10.*

* cited by examiner

*Primary Examiner* — Cheng-Yuan Tseng

(57) ABSTRACT

An electronic system includes: a portable electronic device; and an electronic device, for detecting whether the portable electronic device is available, and transferring a partial task of a first task, which is to be processed by the electronic device, to the portable electronic device via a transmission interface if the portable electronic device is available; wherein the portable electronic device processes the partial task to generate a processed result and transfers the processed result to the electronic device via the transmission interface such that the electronic device is capable of completely processing the first task.

14 Claims, 4 Drawing Sheets

ELECTRONIC SYSTEM

BACKGROUND OF THE INVENTION

1. Field of the Invention

The present invention relates to an electronic system, and more particularly, to an electronic system having multiple electronic devices, which can share resources with each other.

2. Description of the Prior Art

In nowadays, electronic devices and portable electronic devices are widely used and have become necessary tools in our normal life. An electronic device, such as a personal computer, is very convenient for users to store data, perform mathematical calculations, and access the internet to gather information. Besides, a portable electronic device, such as a cell phone or a PDA, allows a user to communicate with other people, and to store some information (i.e: phone book).

As is known, the technology changes very rapidly. Novel hardware structure, new interfaces, and more complicated software programs are developed quickly. It means that the old electronic device may not support the above-mentioned new interface or may not execute the complicated software program efficiently. This forces the user to update their electronic device (mostly, to buy a new one).

But, to update the electronic devices too frequently is neither economical nor environmental. The industry needs to find a solution to lengthen the life time of an electronic device. For example, as time goes by, if an electronic device should be still able to execute more complicated tasks, the electronic device can survive longer.

SUMMARY OF THE INVENTION

It is therefore a primary objective of the claimed invention to provide an electronic system having electronic devices, which can share their resources, to solve the above-mentioned problems.

According to an objective of the present invention, an electronic system is provided. The electronic system comprises: a portable electronic device; and an electronic device, for detecting whether the portable electronic device is available, and transferring a partial task of a first task, which is to be processed by the electronic device, to the portable electronic device via a transmission interface if the portable electronic device is available; wherein the portable electronic device processes the partial task to generate a processed result and transfers the processed result to the electronic device via the transmission interface such that the electronic device is capable of completely processing the first task.

According to another objective of the present invention, an electronic system is provided. The electronic system comprises a portable electronic device; and an electronic device, for processing a first task to generate a processed result, detecting whether the portable electronic device is available, and transferring the processed result to the portable electronic device via a transmission interface if the portable electronic device is available; wherein the portable electronic device temporarily storing the processed result and transfers the processed result back to the electronic device via the transmission interface when the electronic device needs the processed result.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
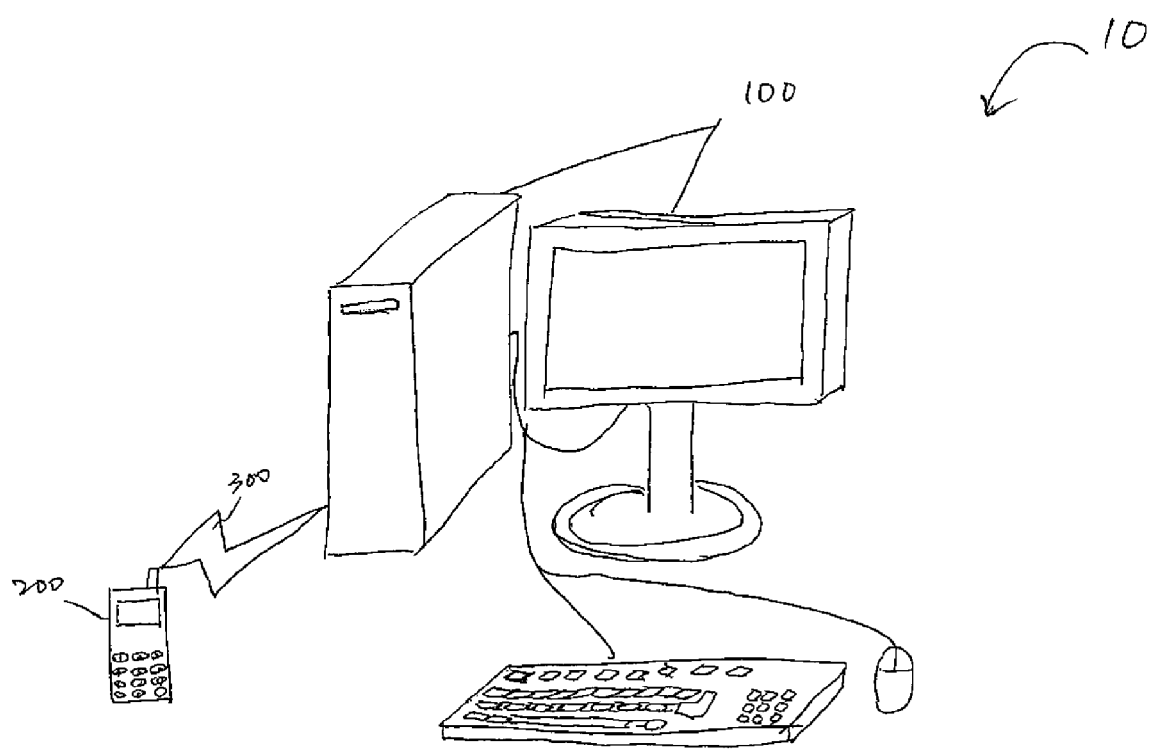
FIG. 1 is a diagram of an electronic system according to the present invention.

Please refer to FIG. 1, which is a diagram of an electronic system 10 according to the present invention. As shown in FIG. 1, the electronic system 10 comprises an electronic device 100 and a portable electronic device 200. In this embodiment, the electronic device 100 is a personal computer, and the portable electronic device 200 is a cell phone. The personal computer 100 and the cell phone 200 are connected via a wireless transmission interface.

Please note, in this embodiment, the personal computer 100 and the cell phone 200 do not work separately. Instead, the personal computer 100 and the cell phone 200 are able to communicate with each other, and share their resources with each other via the wireless transmission interface.

In this embodiment, when the personal computer 100 processes a task, the personal computer 100 searches for an available portable electronic device, which could be used to share resource with it. Here, the cell phone 200 is available for sharing resource with the personal computer 100, and thus can be regarded as an extended device of the personal computer 100. In this embodiment, the cell phone 200 provides its hardware to help the personal computer 100 process the task.

Please note, in an embodiment of the present invention, the personal computer 100 transfers a partial task of the task to be processed to the cell phone 200 via the transmission interface 300. And then, the cell phone 200 processes the partial task to generate an execution result. The personal computer 200 processes the task except for the partial task. Then, when the personal computer 200 needs the execution result to completely process the task, the cell phone 200 transfers the execution result of the partial task back to the personal computer. In this way, the personal computer 200 can utilize the execution result to completely process the task.

From the above, it can be seen that the personal computer 100 and cell phone 200 co-works to process the task.

In another embodiment of the present invention, the cell phone 200 can be regarded as an external storage device of the personal computer 100. This means the personal computer 100 can utilize the cell phone 200 as a data buffer.

That is, when the personal computer 100 processes a task, the personal computer 100 transfers the processed result to the cell phone 200 for temporary storage. And then, when the personal computer 100 needs the processed result in the following execution, the processed result is sent back to the personal computer 100 such that the personal computer 100 can completely process the task.

Furthermore, the aforementioned sharing mechanism can be implemented for one having ordinary skills in the art, and thus omitted here. For example, the personal computer 100 and the cell phone 200 can embed an identification software program and a sharing software program. Both the personal computer 100 and the cell phone 200 execute the verification software program first to identify each other in order to get ready to communicate. And then, the personal computer 100 and the cell phone 200 execute the sharing program to perform the above-mentioned procedure such that the cell phone 200 can be the external processing unit or the data buffer of the personal computer 100.

Figure 2:
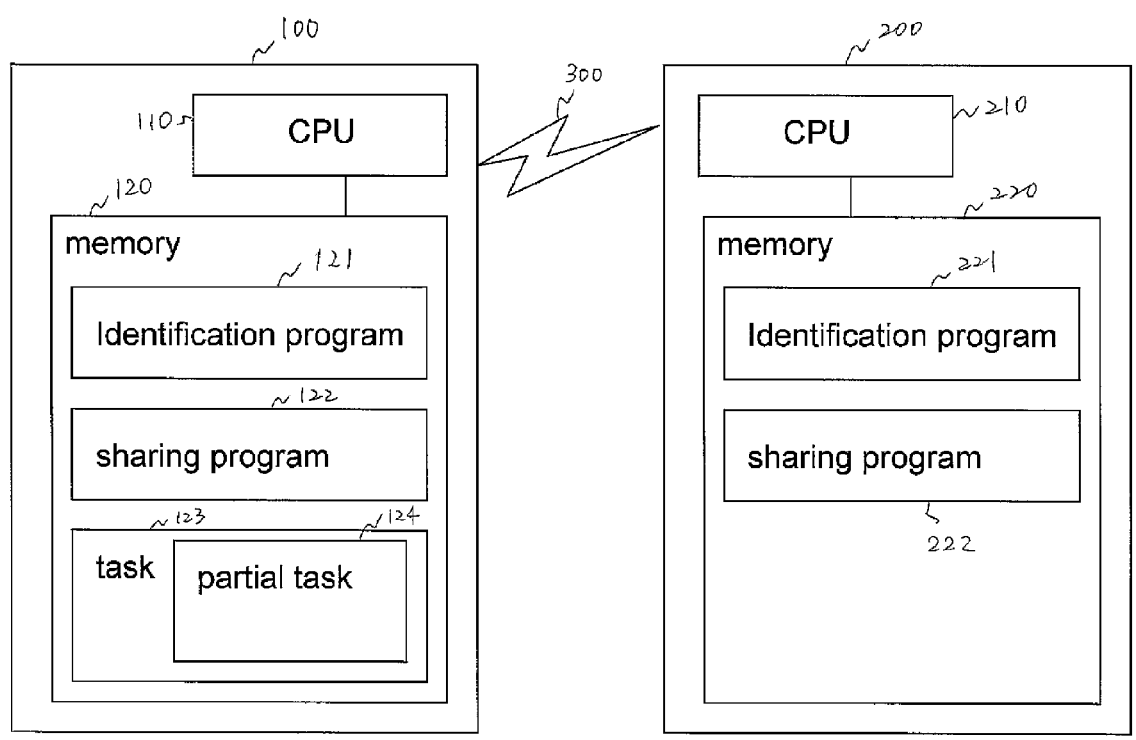
FIG. 2 shows a block diagram of the electronic system shown in FIG. 1.

Please refer to FIG. 2, which shows a block diagram of the electronic system 10 shown in FIG. 1. As shown in FIG. 2, the personal computer 100 comprises a CPU 110 and a memory 120. The memory 120 stores an identification program 121, a sharing program 122, and a task 123. The task 123 comprises a partial task 124. The personal computer 100 and the cell phone 200 are connected via the wireless transmission interface 300.

In addition, the cell phone comprises a CPU 210 and a memory 220. The memory 220 stores an identification program 221 and a sharing program 222.

When the personal computer 100 starts to process the task 123, the CPU 110 processes the task 123 stored in the memory 120, and executes the identification program 121 stored in the memory 120 to search whether there is an available portable electronic device.

In this embodiment, the CPU 110 executes the identification program 121 to emit an identification request to a portable electronic device. And if the portable electronic device is able to communicate with the personal computer 100, the portable electronic device will response to the request and the personal computer 100 and the portable electronic device can establish the connection. The identification program 121 can also comprise a security mechanism. The security mechanism will check the identity of the portable electronic device and only if the portable electronic device is on a predefined list, the personal computer 100 and the portable electronic device will establish the connection.

For example, in this embodiment, after receiving the above-mentioned request, the CPU 210 of the cell phone 200 responses to the request (e.g. send a response to the personal computer 100) to inform the personal computer 100 that the cell phone 200 is available and ready to communicate such that the cell phone 200 and the personal computer 100 can establish the connection.

After the connection is established, the CPU 110 executes the sharing program 122 and the CPU 210 executes the sharing program 222 such that the personal computer 100 and the cell phone 200 can establish the sharing mechanism.

Figure 3:
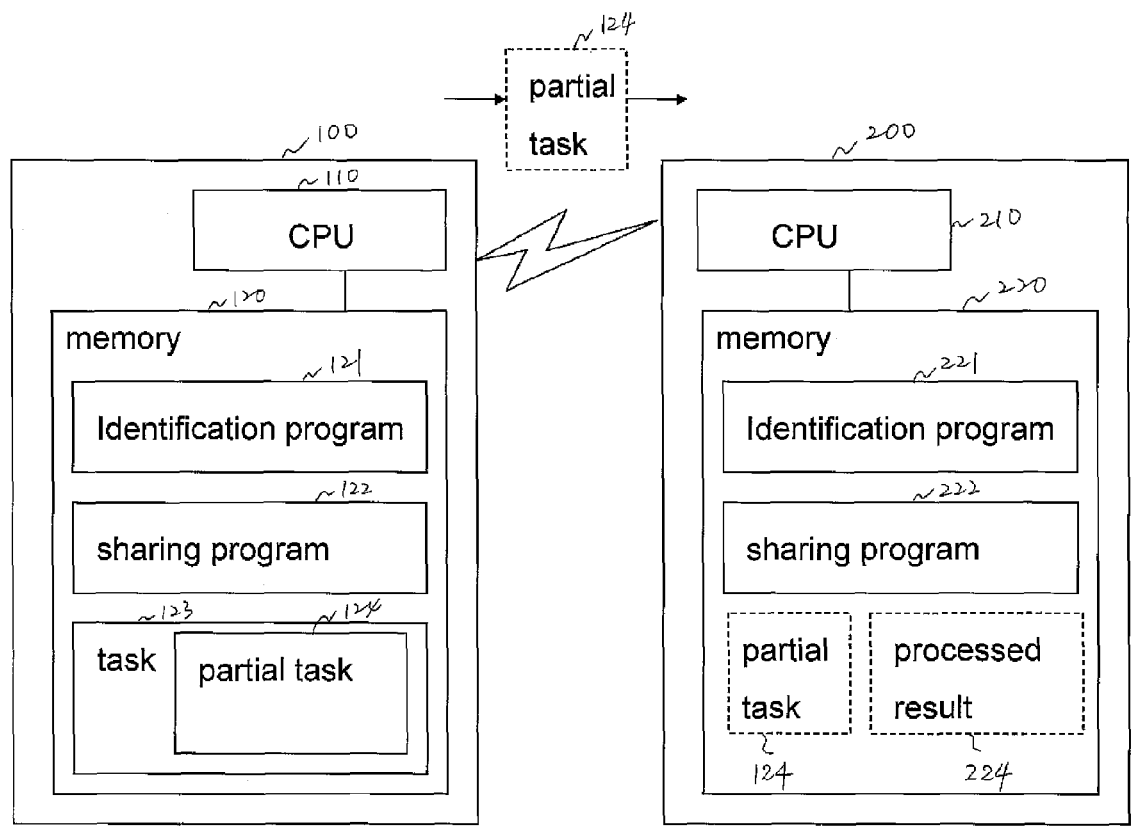
FIG. 3 is a diagram showing how the PC and the cell phone work together according to a first embodiment of the present invention.

Please refer to FIG. 3, which is a diagram showing how the PC 100 and the cell phone 200 work together according to a first embodiment of the present invention. As shown in FIG. 3, after the sharing mechanism is established, the PC 100 transfers the partial task 124, which is a part of the being-processed task, to the cell phone 200. The CPU 210 receives the partial task, and recognizes that the partial task should be processed according to the sharing program 222. And then, the CPU 210 executes the partial task to generate a processed result 224 and stores the processed result 224 in the memory 220.

Simultaneously, the CPU 110 processes the task. Please note, in this embodiment, the CPU 110 does not process the partial task. Instead, the cell phone 200 is responsible for processing the partial task. Therefore, the CPU 110 needs the processed result 224 to complete the task. When the CPU 110 needs the processed result 224, the CPU 110 executes the sharing program 122 to send a request to the cell phone 200. And then, the cell phone 210 receives the request, and sends the processed result 224 to the PC 100. In this way, the PC 100 can process the remaining task according to the processed result 224 such that the task can be completely processed. The CPU 210 can also transmit the processed result to the PC 100 after the partial task 124 is being processed.

Similarly, in another embodiment, the cell phone 200 acts as a data buffer. Please refer to FIG. 4, which is a diagram showing how the PC 100 and the cell phone 200 work together according to a second embodiment of the present invention.

Figure 4:
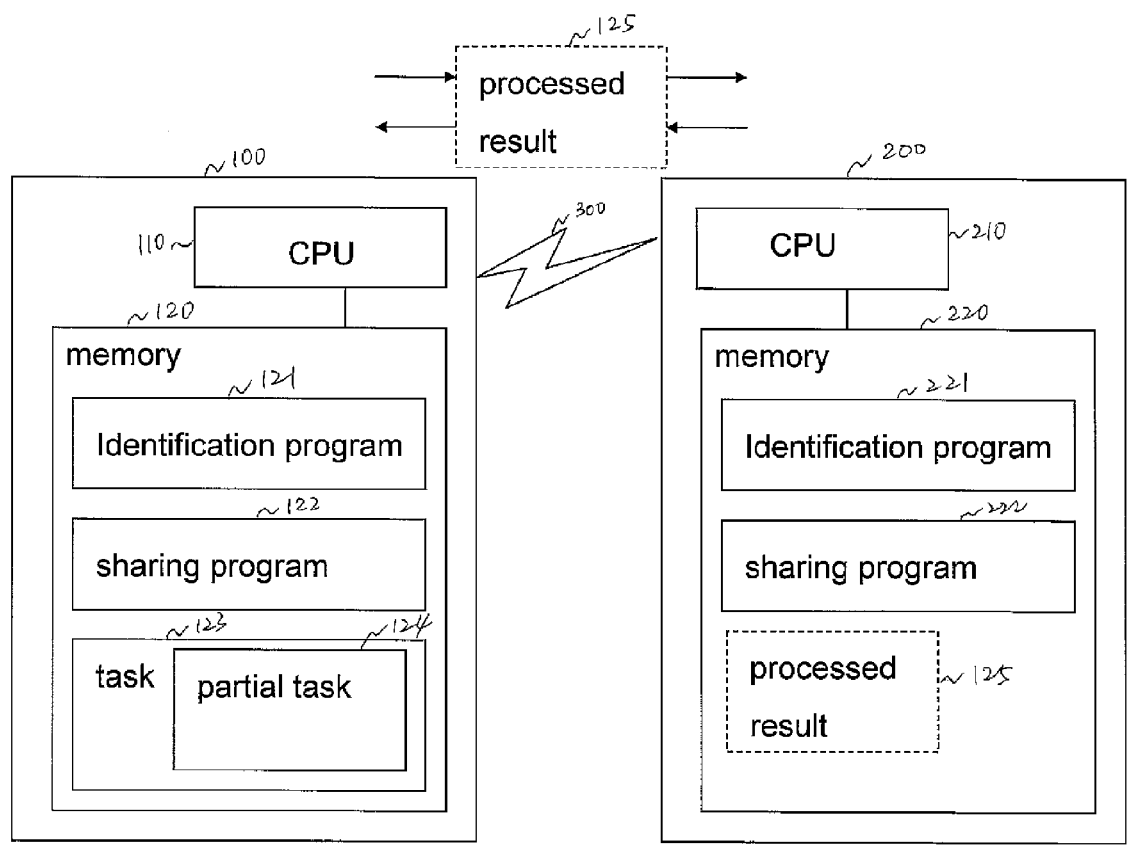
FIG. 4 is a diagram showing how the PC and the cell phone work together according to a second embodiment of the present invention.

As shown in FIG. 4, after the sharing mechanism is established, the PC 100 processes the partial task 124, which is a part of the being-processed task, to generate a processed result 125. The processed result 125 will be used later. And then, the CPU 110 transfers the processed result 125 to the cell phone 200. The CPU 210 receives the processed result 125, and the CPU 210 stores the processed result 125 in the memory 220.

Simultaneously, the CPU 110 continues to process the task. When the CPU 110 needs the processed result 125, the CPU 110 executes the sharing program 122 to send a request to the cell phone 200. And then, the cell phone 210 receives the request, and sends the processed result 125 to the PC 100. In this way, the PC 100 can process the remaining task according to the processed result 125 such that the task can be completely processed.

Please note, the PC 100 is not limited to transmit the partial task or the processed result, only. In another embodiment of the present invention, the PC 100 can transmit some data that will not be used frequently to the memory 220 of the cell phone 200. For example, the PC 100 can determine the priority of data and deliver the data to different destinations according to the priority. If the priority is the highest, it means the data will be used immediately or very frequently so that the PC 100 transfers the data to a cache or DRAM of the PC 100. But if the priority of the data is lower (or complies with a predetermined priority criterion), it means the data would be used not so frequently. Therefore, the PC 100 transfers the data to the memory 220 of the cell phone 200 and the cell phone 200 can temporarily store it until the PC 100 needs it.

Please note, the present invention does not limit the type of the memory 220 of the cell phone 200. In this embodiment, the memory 220 can be a flash memory or a DRAM. These changes also obey the spirit of the present invention.

In addition, the present invention does not limit the location of memory space where the data (processed data or partial task) should be stored. The cell phone 200 can store the data randomly. Or, the cell phone 200 can create a dedicated memory space for the PC 100 and all the data transferred by the PC 100 are stored inside the dedicated memory space. These changes also obey the spirit of the present invention.

In the above-mentioned embodiments, the cell phone 200 and the personal computer 100 are connected via the wireless transmission interface 300. And this structure is only utilized as an embodiment, not a limitation. In the actual implementation, the cell phone 200 and the personal computer 100 can be connected via every transmission interface including wire and wireless interfaces. For example, the wire transmission interface can be any cable, or USB interfaces, and the wireless transmission interface can be Bluetooth, infrared ray transmission interface, or WLAN interfaces.

In addition, the personal computer 100 and the cell phone 200 are only used as embodiments, not limitations of the present invention. In the actual implementation, the electronic device can be implemented with a laptop, a server, or any other electronic device, and the portable electronic device can be implemented with a laptop or PDA. These changes all obey the spirit of the present invention.

Those skilled in the art will readily observe that numerous modifications and alterations of the device and method may be made while retaining the teachings of the invention.

What is claimed is:

1. An electronic system comprising:
   a portable electronic device; and
   an electronic device, configured to detect whether the portable electronic device is available, and configured to transfer a partial task of a first task, via a wireless transmission interface to the portable device, such that the first task is to be processed by the electronic device, and the partial task is to be simultaneously processed by the portable electronic device when the portable electronic device is available;
   wherein the portable electronic device receives the partial task via the wireless transmission interface, shares hardware resource to calculate the partial task to generate a calculated result, and transfers the calculated result back to the electronic device via the wireless transmission interface; and
   wherein the electronic device calculates the first task other than the partial task co-working at the same time when the portable electronic device calculates the partial task.

2. The electronic system of claim 1, wherein the electronic device comprises a personal computer or a laptop, and the portable electronic device includes a cell phone, or a personal digital assistance (PDA).

3. The electronic system of claim 1, wherein the wireless transmission interface is a BLUETOOTH interface or a wireless local area network (WLAN) interface.

4. The electronic system of claim 1, wherein the wireless transmission interface has a security mechanism, for ensuring the partial task to be transferred only between the electronic device and the portable electronic device.

5. An electronic system comprising:
   a portable electronic device; and
   an electronic device, configured to calculate a first task to generate a calculated result, to detect whether the portable electronic device is available to share hardware resource, and to transfer the calculated result to the portable electronic device via a wireless transmission interface if the portable electronic device is available to share hardware resource;
   wherein the first task is partial of a second task, the portable electronic device temporarily storing the calculated result at the same time when the electronic device calculates the second task other than the first task, and transfers the calculated result back to the electronic device via the wireless transmission interface when the electronic device needs the calculated result such that the portable electronic device is utilized as a data buffer for the first task of the electronic device during the calculation of the second task.

6. The electronic system of claim 5, wherein the electronic device receives the calculated result from the portable electronic device via the transmission interface and continuously calculates the second task according to the calculated result.

7. The electronic system of claim 5, wherein the electronic device comprises a personal computer or a laptop, and the portable electronic device includes a cell phone, or a personal digital assistance (PDA).

8. The electronic system of claim 5, wherein the wireless transmission interface comforms a BLUETOOTH interface or a wireless local area network (WLAN) interface.

9. The electronic system of claim 5, wherein the wireless transmission interface has a security mechanism, for ensuring the processed result to be transferred only between the electronic device and the portable electronic device.

10. An electronic system, comprising:
    an electronic device, comprising:
    a computing unit, configured to execute a first task; and
    an external computing unit, embedded inside a portable electronic device, configured to aid the electronic device to execute the first task by executing a partial task of the first task at the same time when the electronic device executes the first task other than the partial task;
    wherein the external computing unit executes the partial task received from the electronic device via a wireless transmission link to generate an execution result while the computing unit executes the first task simultaneously, and the computing unit continuously executing the first task through using the partial task execution result returned from the external computing unit via the transmission link.

11. The electronic system of claim 10, wherein the electronic device comprises a personal computer or a laptop, and the portable electronic device includes a cell phone, or a personal digital assistance (PDA).

12. A system comprising:
    a portable electronic device; and
    an electronic device configured to detect whether the portable electronic device is available, and configured to transfer a partial task of a first task via a transmission interface to the portable device, such that the first task is to be processed by the electronic device, and the partial task is to be simultaneously processed by the portable electronic device when the portable electronic device is available;
    wherein the portable electronic device receives the partial task via the transmission interface, shares hardware resource to calculate the partial task to generate a calculated result, and transfers the calculated result back to the electronic device via the transmission interface;
    wherein the electronic device calculates the first task other than the partial task co-working at the same time when the portable electronic device calculates the partial task; and
    wherein the electronic device consists of a personal computer or a laptop, and the portable electronic device consists of a cell phone, or a personal digital assistance (PDA).

13. The system of claim 12 wherein the transmission interface is a wire or a wireless transmission interface.

14. The system of claim 13, wherein the wireless transmission interface is a BLUETOOTH interface or a wireless local area network (WLAN) interface.

* * * * *